(12) United States Patent
Kilmer

(10) Patent No.: US 7,191,924 B2
(45) Date of Patent: Mar. 20, 2007

(54) BICYCLE CELL PHONE HOLDER

(76) Inventor: George M. Kilmer, 4265 Wilshire Dr., Marion, IN (US) 46952

( * ) Notice: Subject to any disclaimer, the term of this patent is extended or adjusted under 35 U.S.C. 154(b) by 591 days.

(21) Appl. No.: 10/766,351

(22) Filed: Jan. 28, 2004

(65) Prior Publication Data

US 2005/0161484 A1  Jul. 28, 2005

(51) Int. Cl.
*B62J 7/06* (2006.01)

(52) U.S. Cl. .................. 224/420; 224/452; 224/455; 224/463; 224/929

(58) Field of Classification Search ............ 224/420, 224/421, 425, 431, 907, 929, 463, 407, 563
See application file for complete search history.

(56) References Cited

U.S. PATENT DOCUMENTS

| 4,754,901 A * | 7/1988 | Villanueva et al. ......... 224/418 |
| 4,974,759 A * | 12/1990 | McDonough ............... 224/443 |
| 4,981,243 A * | 1/1991 | Rogowski ................... 224/431 |
| 5,406,816 A | 4/1995 | Thomas |
| 5,651,485 A * | 7/1997 | Impastato, II ............... 224/460 |
| 5,771,305 A * | 6/1998 | Davis ......................... 381/386 |
| 6,305,241 B1 * | 10/2001 | Masui et al. ............... 74/551.8 |
| 6,315,182 B1 * | 11/2001 | Chen .......................... 224/420 |
| 6,463,385 B1 | 10/2002 | Fry |
| 6,481,684 B1 | 11/2002 | Farmer et al. |
| 6,564,673 B1 | 5/2003 | Kilmer |
| 6,932,377 B2 * | 8/2005 | Bretschger et al. ......... 280/642 |
| 2002/0020249 A1 | 2/2002 | Darland et al. |
| 2002/0113185 A1 | 8/2002 | Ziegler |
| 2002/0131606 A1 | 9/2002 | Stanberry et al. |
| 2003/0106919 A1 | 6/2003 | Chuang |
| 2003/0140727 A1 | 7/2003 | Chuang |
| 2005/0045681 A1 * | 3/2005 | Hancock et al. ............ 224/401 |

* cited by examiner

*Primary Examiner*—Nathan J. Newhouse
*Assistant Examiner*—Corey N. Skurdal
(74) *Attorney, Agent, or Firm*—Woodard, Emhardt, Moriarty, McNett & Henry LLP

(57) ABSTRACT

A cell phone holder for mounting to bicycle handlebars. The cushion includes a front socket for receiving a cell phone positioning the cell phone in front of the face of the bicyclist when in a racing position. A left and right socket provided on the cell phone holder allow for the mounting of the cell phone adjacent the left and right ear of the bicyclist.

16 Claims, 5 Drawing Sheets

BICYCLE CELL PHONE HOLDER

BACKGROUND OF THE INVENTION

1. Field of the Invention

The present invention relates generally to the field of bicycles and more specifically, cell phone holders for mounting to bicycle handlebars.

2. Description of the Prior Art

In order to maximize the comfort and safety of the bicyclist, it is desirable to provide a bicycle construction to accommodate the various positions of the bicyclist. For example, the bicyclist may assume an erect position or may bend forwardly to reduce air resistance when racing or bicycling at a fast pace. Likewise, when riding long distances, the bicyclist may want to change the position of his or her hands relative to the handlebars. The hands may be spread apart a great distance on the handlebars when negotiating difficult terrain or when in traffic whereas the hands may be placed relatively close together on the handlebars when traversing relatively flat terrain without traffic. Further, in order to apply maximum pressure to the pedals, it is desirable that the bicyclist grip the handlebars in a location to exercise maximum force. In my U.S. Pat. No. 6,564,673 I have disclosed a bicycle construction including a handlebar design allowing the bicyclist to grip the handlebar in four completely different positions.

It is desirable for a bicyclist to be able to communicate via a cell phone; however, verbal communications become difficult when the bicyclist is bending forward to reduce air resistance when racing or bicycling at a fast pace. For example, in my aforementioned U.S. patent, there is disclosed a chin rest upon which the bicyclist may place his or her chin when in the racing position. Use of a cell phone in such a position becomes awkward plus difficult for the bicyclist to hear the phone audio. I have therefore designed a cell phone holder that is mounted to the handlebars in such a manner to allow the bicyclist to communicate while in the forward racing position. Disclosed herein is such a cell phone holder. Further, the holder may be utilized to receive various types of communication devices including a global positioning transmitter and receiver.

A number of U.S. patent and published U.S. patent applications disclose a variety of holders for securing cell phones. For example, in the U.S. Pat. No. 6,481,684 issued to Farmer et al., there is disclosed a cell phone holder that is mounted by brackets directly to the handlebars. U.S. Pat. No. 6,463,385 issued to Fry discloses a sports computer with a global positioning receiver mounted to a bicycle handlebar. U.S. Pat. No. 6,315,182 issued to Chen discloses a pouch assembly for holding a cell phone that is adapted to mount to a variety of bases including a cylindrical bar. U.S. Pat. No. 5,406,816 issued to Thomas discloses a basket for mounting a container to a bicycle handlebar.

U.S. Patent Application Publication U.S.2003/0106919A1 of Chuang discloses a device mountable on a bicycle handlebar for attaching a cell phone bag. U.S. Patent Application Publication US2003/0140727A1 of Chuang also discloses a bracket for attaching to the handlebar collar to allow for attachment of a cell phone bag.

Further, in U.S. Patent Application Publication US2002/0131606A1 of Stanberry et al., a mounting arrangement is disclosed for securing a storage pouch to the windshield of a motorcycle. A cell phone mounting arrangement is disclosed in U.S. Patent Application Publication US2002/0113185A1 of Ziegler and includes a holder for securing a phone to the handlebars or frame of a bicycle. In addition, U.S. Patent Application Publication 2002/0020249A1 of Darland et al. discloses a cell phone holder mountable to the handlebars. Despite the above constructions, there is a need for a cell phone holder construction mounted to the bicycle handlebars in such a manner to allow the bicyclist to communicate via the cell phone when in the forward leaning or racing position. Further, the holder should be adaptable to place the cell phone in front of the face of the bicyclist and also adjacent the left ear and/or right ear of the bicyclist.

SUMMARY OF THE INVENTION

One embodiment of the present invention is a cell phone holder for a handlebar of a bicycle for use by a bicyclist riding the bicycle including a base for mounting to the bicycle handlebar. A flexible soft cushion is mounted to and extends over the base with a fastening device holding the cushion to the base. A hard cover is mounted to the cushion and extends at least partially over and atop the flexible soft cushion. The cover includes a hole formed therein through which a cell phone may be inserted. A sleeve is aligned with the hole and extends downwardly there from against the flexible soft cushion. The sleeve has an interior passage into which a phone may be inserted and releasably held thereby. Additional side pockets to hold the cell phone may be provided.

It is an object of the present invention to provide a new and improved handlebar construction allowing for the mounting of a cell phone.

A further object of the present invention is to provide a cell phone holder mounted to a chin rest secured to bicycle handlebars.

A further object of the present invention is to provide a bicycle cell phone holder construction locating the cell phone forward of the face of the bicyclist and also adjacent the left ear and/or right ear of the bicyclist.

An additional object of the present invention is to provide a bicycle handlebar construction having a cushion portion upon which the chin of the bicyclist may rest while the bicyclist communicates via a cell phone mounted adjacent the chin rest.

In addition to the prior objects, it is an object of the present invention to provide a cell phone holder mounted to the handlebars of a bicycle wherein the handlebars have a variety of configurations to allow different positions assumed by the bicyclist.

Related objects and advantages of the present invention will be apparent from the following description.

DESCRIPTION OF THE PREFERRED EMBODIMENT

Figure 1:
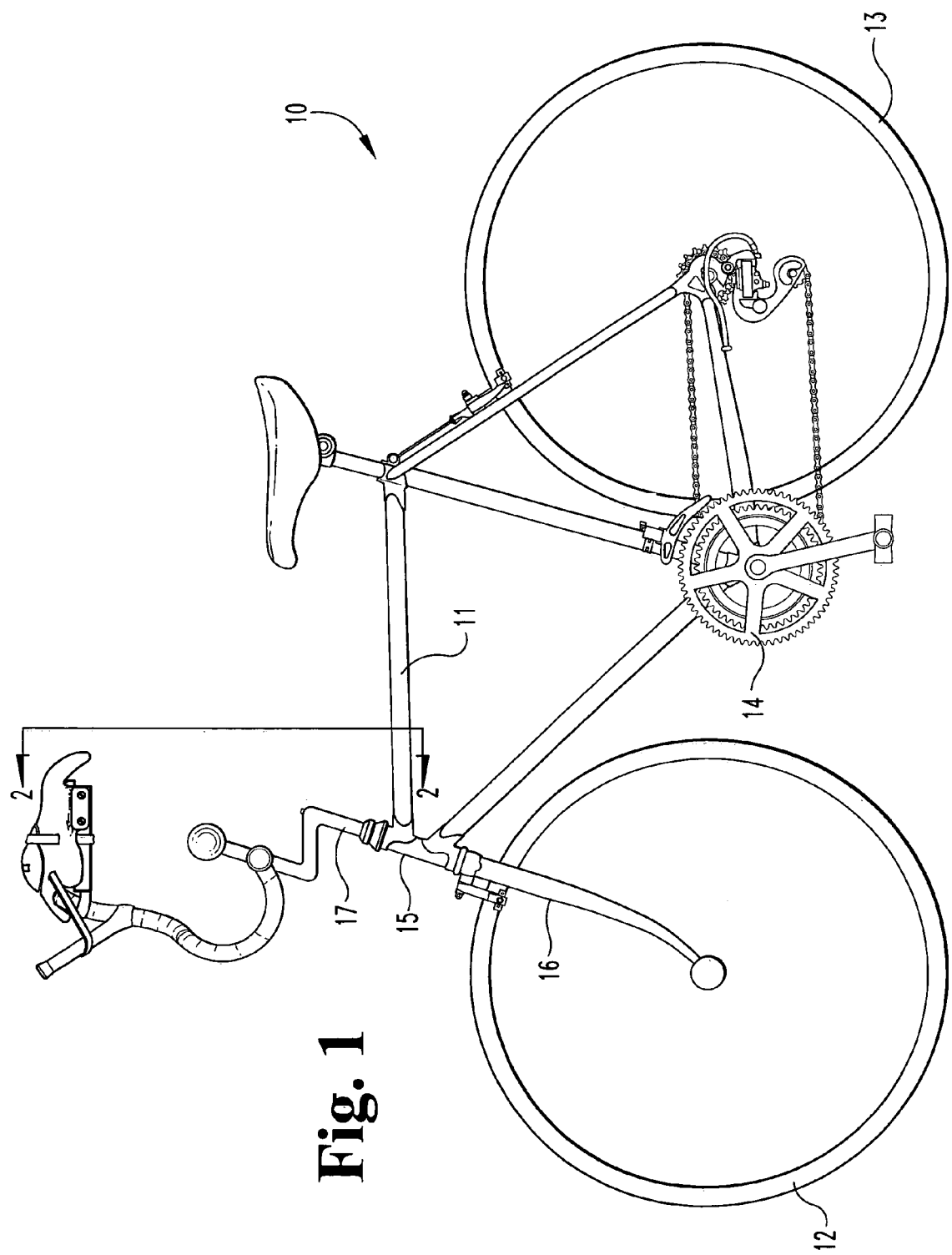
FIG. 1 is a side view of a bicycle incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a conventional road bicycle 10 having a bicycle frame 11 with a front wheel 12 and rear wheel 13 rotatably mounted thereto. A conventional chain sprocket combination 14 is mounted to frame 11 and is engaged with the driving mechanism of the rear wheel 13. The front of the frame includes a cylindrical tube 15 through which the bicycle fork 16 extends and is attached to the downwardly extending steering column 17 in the conventional manner.

Figure 2:
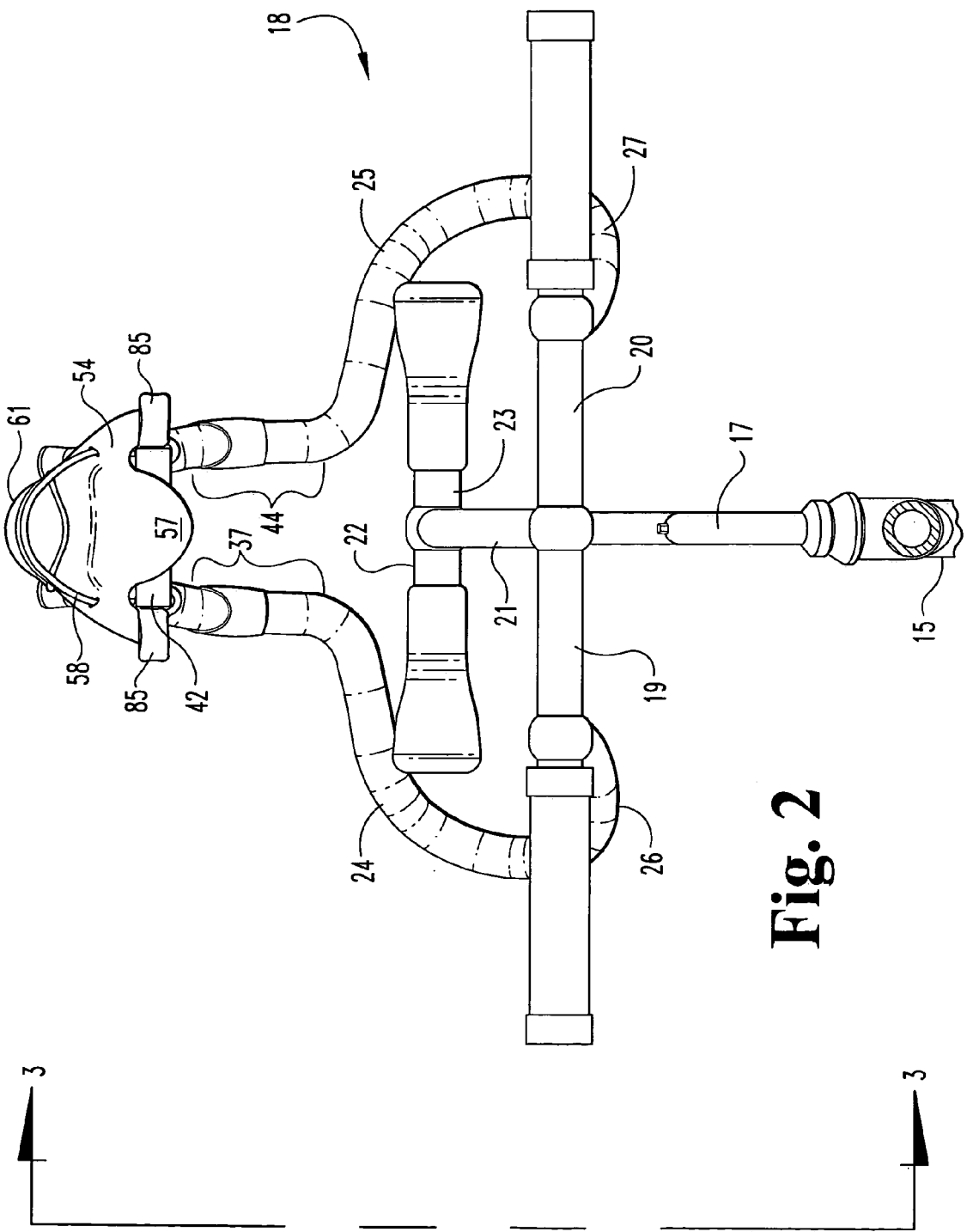
FIG. 2 is an enlarged fragmentary view of the handlebars looking in the direction of arrows 2—2 of FIG. 1.
Figure 3:
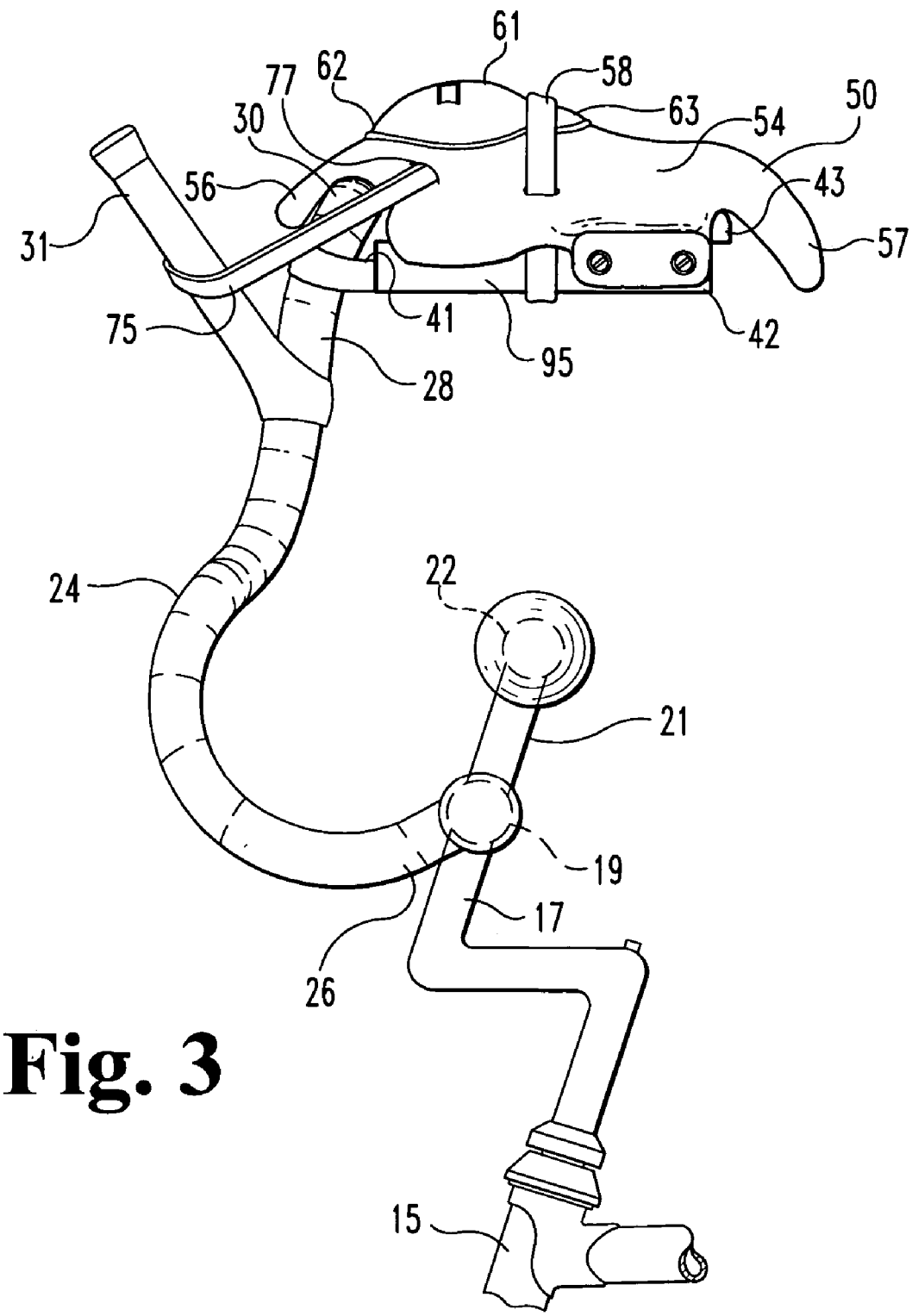
FIG. 3 is an enlarged fragmentary view of the handlebars looking in the direction of arrows 3—3 of FIG. 2.
Figure 6:
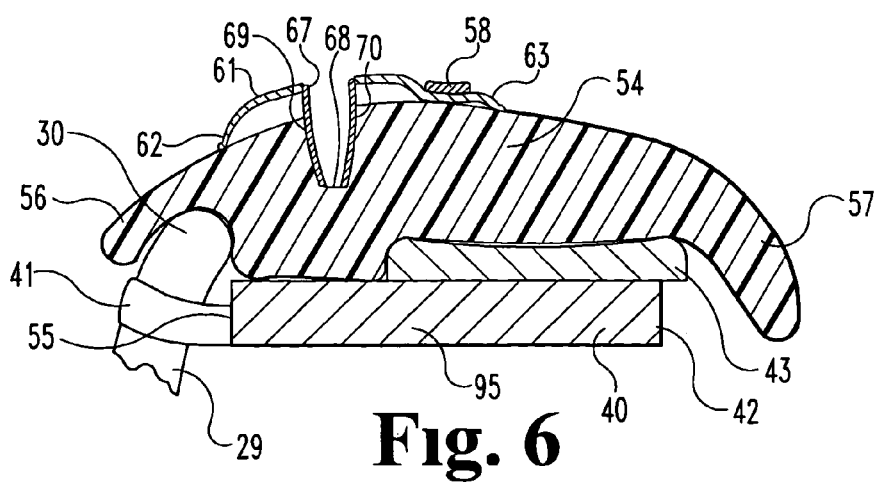
FIG. 6 is an enlarged cross-sectional view taken along a line and viewed in the direction of arrows 6—6 of FIG. 4.
Figure 7:
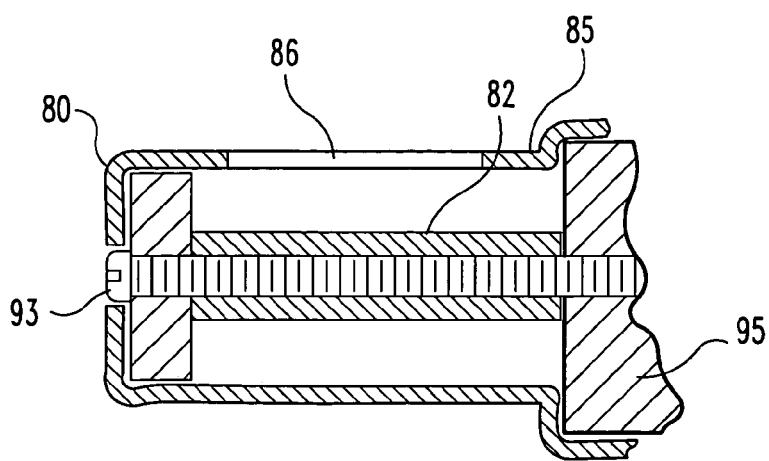
FIG. 7 is an enlarged cross-sectional view taken along a line and viewed in the direction of arrows 7—7 of FIG. 4.

Attached to the top of steering column 17 is handlebar construction 18 (FIG. 2). Construction 18 includes a pair of mutually opposed and oppositely extending horizontal handlebars 19 and 20 integrally attached to the steering column or handlebar mounting stem 17 rotatably mounted to tube 15. Stem 17 extends upwardly from bars 19 and 20 forming a stem extension 21 having a pair of oppositely directed, aligned and horizontally extending bars 22 and 23. Yet a further pair of mutually opposed handlebars 24 and 25 have respectively proximal ends 26 and 27 mounted to bars 19 and 20. The distal end portions 28 and 29 (FIGS. 3 and 6) of bars 24 and 25 are integrally connected together and meet at a center portion 30 in line with stem 17. A pair of handles 31 and 32 are attached and project upwardly from respectively distal end portions 28 and 29 of bars 24 and 25. Proximal end portions 26 and 27 may either be integrally attached to bars 19 or 20 or may be fastened thereto by conventional clamping fasteners.

Handlebars 19 and 20 are the conventional handlebars provided on a bicycle. The end portions may be provided with cushioned grips to grab when mounting the bicycle and for use in tricky or difficult conditions requiring more stability. When the distal ends of bars 19 and 20 are gripped, the hands of the bicyclist are located far apart allowing greater control of stem 17 and wheel 12. Handlebars 19 and 20 are particularly useful when negotiating traffic or over difficult rocky terrain.

Head support 40 (FIG. 6) is cantileverly mounted to center portion 30 of bars 24 and 25 by bracket 41 having one end attached to center portion 30 and the opposite end of bracket 41 attached to head support 40. Head support 40 has a rectangular shaped block configured main body 95 with a distal end 42 and a foam cushion 43 secured to the upper horizontally extending surface of end 42. Cushion 43 is positioned approximately over bars 19, 20, 22, and 23 thereby allowing the bicyclist to rest his or her chin thereon as handles 31 and 32 are gripped with the forearms resting on portions 37 and 44 of bars 24 and 25 and the elbows resting on bars 22 and 23. Head support 40 is thereby located between the arm receiving portions 37 and 44 of bars 24 and 25. Further construction details concerning handlebar construction 18 and head support 40 is disclosed in my U.S. Pat. No. 6,564,673 which is hereby incorporated by reference.

Figure 4:
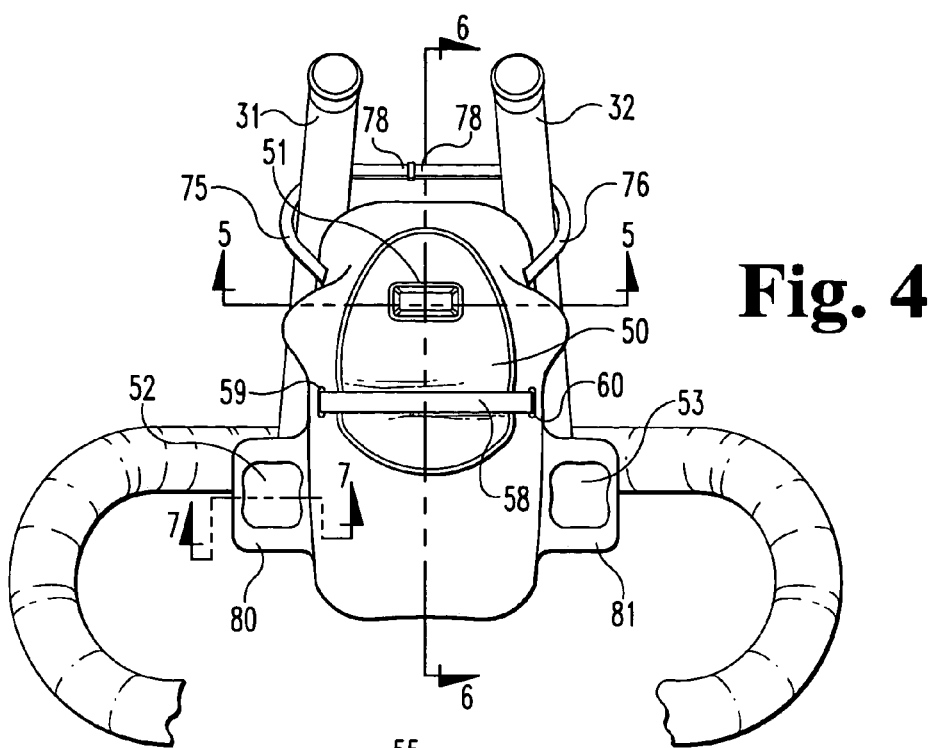
FIG. 4 is a top view of the handlebar construction with cell phone holder.

Cell phone holder 50 is mounted atop head support 40, in turn, secured by bracket 41 to center portion 30. Holder 50 (FIG. 4) includes a center socket 51, a left side socket 52 and a right side socket 53 for releasably holding a cell phone. Thus, as the bicyclist rests his or her chin atop holder 50, the cell phone will be positioned either immediately in front of the bicyclist or to the side of the left ear or right ear of the bicyclist.

Holder 50 includes a cushion 54 (FIGS. 5 and 6) which extends across the length and width of the rectangular shaped block configured main body 95 of the head support 40 and also across the length and width of the foam cushion 43 secured to the upper horizontally extending edge portion 42 of the main body 95. Bracket 41 (FIG. 3) is attached to main body 95 and then is secured to center portion 30 by conventional means. Cushion 54 extends past the proximal end 55 (FIG. 6) of main body 95 with end 56 of the cushion extending over and forward of center portion 30. Likewise, the end portion 57 of cushion 54 extends over and rearwardly of cushion 43. Cushion 54 may be produced from a variety of materials, including synthetic rubberized material enclosed in a suitable cloth. For example, the cloth may be synthetic and produced in such a manner that the cloth is both washable and immune to ultraviolet radiation resulting from the bicycle being in the sun for long periods of time.

Cushion 54 may be mounted to headrest main body 95 by a variety of means including a strap 58 that extends over and across cushion 54 and then to the side and beneath the main body 95. For example, a strap may be utilized having opposite ends with conventional fastening means whereby the opposite ends of the strap may be releasably secured together allowing for the removal and installation of the cushion. Strap 58 is located between the center socket 51 and the two side sockets 52 and 53. A pair of slots 59 and 60 extend through cushion 54 and main body 95 to allow strap 58 to extend through both slots to the bottom side of main body 95 where the opposite ends of the strap are fixed together.

Figure 5:
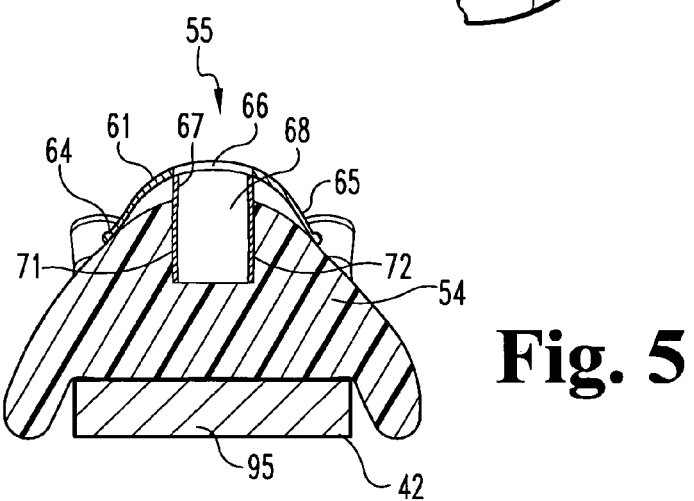
FIG. 5 is an enlarged cross-sectional view taken along a line and viewed in the direction of arrows 5—5 of FIG. 4.

A hard or rigid plastic cover 61 extends over and atop cushion 54 surrounding center socket 51. Cover 61 may be produced from relatively rigid sheet material thereby adding rigidity to the forward portion of the cushion. Cover 61 has a forward edge 62 (FIG. 6) located approximately over the proximal end 55 of main body 95 with the rear edge portion 63 of cover 61 located between strap 58 and cushion 54. Portion 63 of the cover is located forward of the left and right ear sockets 52 and 53. The side portions 64 and 65 (FIG. 5) of cover 61 extend approximately to the side edges of main body 95 (FIG. 5). The edge portions of the cover including the front edge portion 62, the rear portion 63 and side portions 64 and 65 may have a decreased thickness with a plurality of holes extending therethrough to enable the cover to be stitched to cushion 54.

A pair of straps 75 and 76 (FIG. 4) have proximal ends 77 (FIG. 3) fixedly attached to cushion 54 and extend forwardly around handles 31 and 32. The distal ends 78 of each strap 75 and 76 meet forwardly of handles 31 and 32 and have mating fastening means thereon to secure ends 78 together thereby securing the cell phone holder to handles 31 and 32.

Cover 61 includes a hole 66 (FIG. 5) defining the entrance for cell phone socket 51. A rubber sleeve 67 surrounds the socket and defines a hole 68 into which the cell phone may be inserted. The front wall 69 and back wall 70 of sleeve 67 (FIG. 6) converge at the bottom of hole 68 providing a general decreasing taper to the socket thereby allowing the front wall 69 and back wall 70 of the sleeve to grip the cell phone as it is inserted downwardly into the socket. The sidewalls 71 and 72 of the sleeve may either be parallel or converge in a manner similar to walls 69 and 70. The tapered socket allows for different size cell phones to be inserted into the socket. Further, thin cell phones will lean toward the front of the bicycle whereas a relatively thick phone will stand upright in the socket. Cushion 54 is provided with a suitable cavity to receive sleeve 67.

Figure 8:
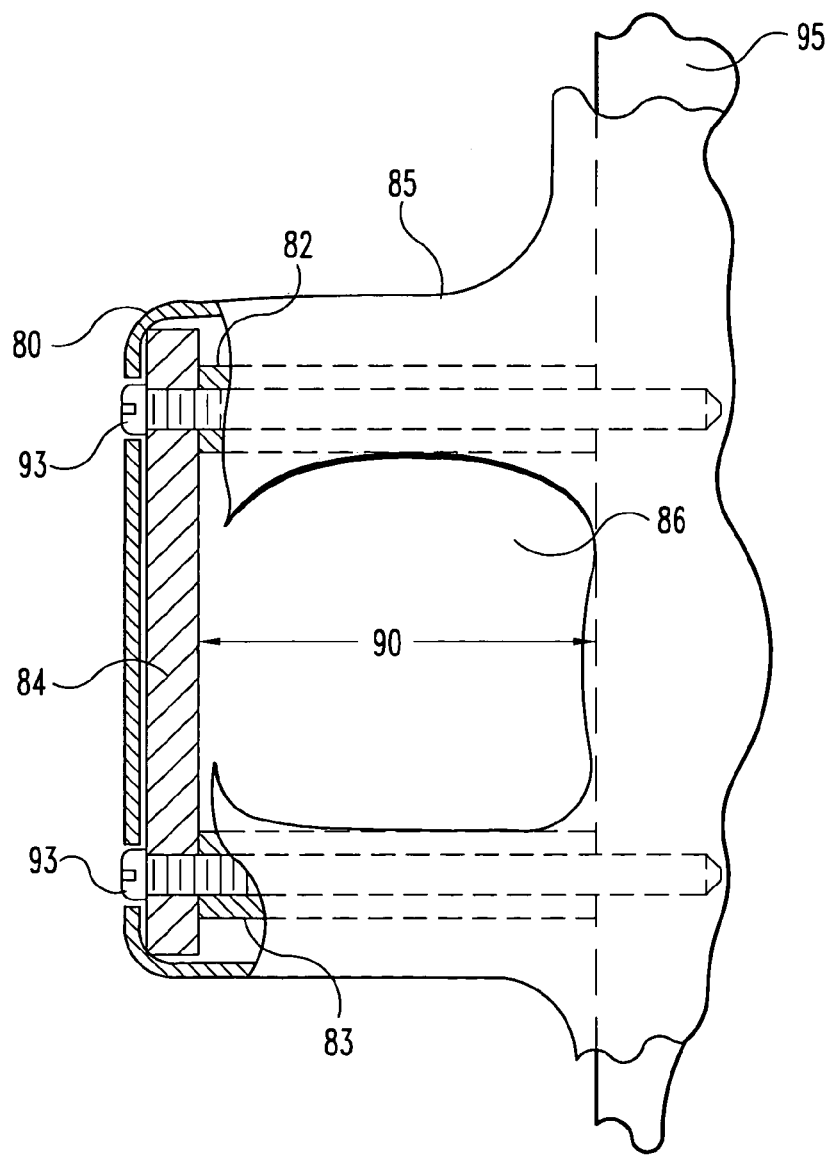
FIG. 8 is an enlarged fragmentary top view of the left cell phone holder.

The left ear socket 52 and right ear socket 53 are formed in an identically constructed left ear cell phone holder 80 and right ear cell phone holder 81. Holder 80 will now be described it being understood that an identical description applies to holder 81. Holder 80 includes a pair of spacers 82 and 83 (FIG. 8) fixedly mounted to headrest main body 95 by a pair of conventional fastening devices 93. A plastic plate 84 is positioned between the heads of fasteners 93 and the outer ends of spacers 82 and 83. A cloth fabric 85 extends around the spacers and includes an opening 86 through which a cell phone may be inserted. Fabric 85 extends across the bottom of the spacers thereby providing a cell phone pocket into which the cell phone may be inserted via opening 86. The spacing or distance 90 (FIG. 8) between plate 84 and headrest main body 95 is selected to allow a slight interference fit with respect to the thickness of the cell phone as the cell phone is inserted into the socket. Thus, depending upon the thickness of the cell phone, fasteners 93 may be removed allowing for different lengths of spacers 82 and 83 to accurately control distance 90. Distance 90 should be approximately equal to or slightly greater than the thickness of the cell phone.

The cell phone holder disclosed herein provides for hand-free listening and talking while riding utilizing the headrest. The side cell phone holders support the phone close to the ear and mouth while the center cell phone holder enables the bicyclist to focus on the road ahead while dialing a phone number.

The prior art devices that mount phones to bicycles do not adequately locate the phone near the bicyclist. In noisy environments it becomes difficult to carry on a conversation. Further, those prior art devices utilizing pouches are not sufficiently firm for holding the phone when the key buttons are depressed. In the case of rainy conditions, the cell phone must be removed quickly from the headrest and enclosed in a container. The headrest mount disclosed herein solves all of these problems. A particular advantage of my holder is that due to the proximity of the cell phone to the ear, relatively small batteries may be utilized.

The flexible soft cushion 54 is particularly advantageous in that accidental impact by the head of the bicyclist with the cushion absorbs force of the impact. Likewise, the relatively rigid and thin hard cover 61 extending over the front portion of the cushion maintains the configuration and mounting of the cushion.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A cell phone holder for a handlebar of a bicycle for use by a bicyclist riding the bicycle comprising:
    a base for mounting to a bicycle handlebar;
    a flexible soft cushion mounted to and extending over said base;
    a fastening device holding said cushion to said base;
    a hard cover mounted to said cushion and extending at least partially over and atop said flexible soft cushion, said cover including a hole formed therein though which a cell phone may be inserted; and
    a sleeve aligned with said hole and extending downwardly there from against said flexible soft cushion, said sleeve having an interior passage into which a phone may be inserted and releasably held thereby.

2. The cell phone holder of claim 1 and further comprising:
    a left ear cell phone holder mounted to said base; and,
    a right ear cell phone holder mounted to said base, said left ear cell phone holder and said right ear cell phone holder each have an opening through which a cell phone may be inserted.

3. The cell phone holder of claim 2 wherein:
    said cushion has a forward portion, a left portion, a back portion, and a right portion, said back portion forms a chin rest located between said left portion and said right portion to receive the chin of a bicyclist, said left portion and said right portion have respectively said left ear cell phone holder and said right cell phone holder thereon to position a cell phone when inserted therein adjacent said chin rest, said forward portion has said hole and sleeve located thereon forming a center pocket to position a cell phone when inserted therein forward of said chin rest.

4. The cell phone holder of claim 3 and further comprising:
    a first strap extending forward from said cushion to wrap around a bicycle handlebar and hold said cushion thereto; and wherein:
    said fastening device is a second strap extending downwardly from said cushion to wrap around said base and hold said cushion thereto.

5. The cell phone holder of claim 4 and further comprising:
    said left ear cell phone holder and said right ear cell phone holder each include a plate and a spacer mounted to said base with said spacer spacing said plate apart from said base to receive a cell phone insertable between said base and said plate, said left ear cell phone holder and said right ear cell phone holder each further include a fabric wrapped around said spacer that form an interior pocket with an slot opening upwardly to receive a cell phone inserted through said slot and into said interior pocket.

6. The cell phone holder of claim 5 wherein said bicycle includes:
    a first pair of mutually opposed arm supporting bars with said bars each including arm receiving portions that extend upwardly to receive the forearms of a bicyclist when in a forward leaning portion, said base is located between said arm receiving portions and extends rearward toward the bicyclist; and,
    a pair of handles mounted to and located above said arm receiving portions for gripping as the bicyclist leans forward, said first strap extend forward around at least one of said pair of handles holding said cushion thereto.

7. The cell phone holder of claim 6 wherein:
    said sleeve has a top end and a bottom end with said passage extending there between, said sleeve tapers with said passage decreasing in size as said passage extends from said top end to said bottom end allowing a different sized cell phone to be inserted through said top end and wedged into said passage to be held therein.

8. The cell phone holder of claim 7 wherein:
said first pair of mutually opposed arm supporting bars are joined together forming a middle bar, said cushion extends forwardly over said middle bar.

9. The cell phone holder of claim 8 wherein:
said second strap is located between said center pocket and said chin rest and extends over said hard cover.

10. The combination of a handlebar construction of a bicycle and a cell phone holder mounted thereto comprising:
a handlebar mounting stem mountable to a bicycle;
a first pair of mutually opposed arm supporting bars mounted to said stem, said bars each including arm receiving portions that extend upwardly to receive the forearms of a bicyclist when in a forward leaning position;
a pair of handles mounted to and located above said arm receiving portions for gripping as the bicyclist leans forward;
a base mounted to said arm supporting bars;
a cushion mounted to said base and forming a chin rest upon which the bicyclist may rest a chin as the bicyclist leans forward; and,
a cell phone pocket extending downwardly against said cushion and into which a cell phone may be held.

11. The combination of claim 10 and further comprising:
a left cell phone holder and a right cell phone holder mounted to said base and positioned against said chin rest that is located there between and positioning a cell phone located in either holder adjacent the ear of the bicyclist as the chin of the bicyclist rests atop said chin rest.

12. The combination of claim 11 wherein:
said cushion extends forwardly over said arm supporting bars.

13. The combination of claim 12 and further comprising:
a strap extending forwardly from said cushion and around said handles securing said cushion thereto;
a fastening device extending forwardly from said base and around said arm supporting bars securing said base thereto; and,
an additional strap extending from said cushion around said base securing said cushion thereto.

14. A cell phone holder for a handlebar of a bicycle for use by a bicyclist riding the bicycle comprising:
a base; a support arm for mounting the base to a bicycle handlebar;
a flexible soft cushion mounted to and extending over said base, said cushion forming a rear chin rest;
a fastening device holding said cushion to said base;
a left ear cell phone holder mounted to said base adjacent said chin rest; and,
a right ear cell phone holder mounted to said base adjacent said chin rest, said left ear cell phone holder and said right ear cell phone holder each have an opening through which a cell phone may be inserted.

15. The holder of claim 14 and further comprising:
a sleeve extending downwardly against said flexible soft cushion, said sleeve having an interior passage into which a phone may be inserted and releasably held thereby.

16. The holder of claim 15 wherein:
said left ear cell phone holder and said right ear cell phone holder each include a plate and a spacer mounted to said base with said spacer spacing said plate apart from said base to receive a cell phone insertable between said base and said plate, said left ear cell phone holder and said right ear cell phone holder each further include a fabric wrapped around said spacer that form an interior pocket with a slot opening upwardly to receive a cell phone inserted through said slot and into said interior pocket.

* * * * *